US011562611B2

(12) United States Patent
Howarth et al.

(10) Patent No.: US 11,562,611 B2
(45) Date of Patent: Jan. 24, 2023

(54) DERIVING INFORMATION FROM AN OPTICALLY READABLE SECURITY ELEMENT

(71) Applicant: QUANTUM BASE LIMITED, Stockport (GB)

(72) Inventors: David Ian Howarth, Stockport (GB); Robert James Young, Stockport (GB); Nema Mohamed Safwat Ibrahim Abdelazim, Stockport (GB)

(73) Assignee: Quantum Base Limited, Stockport (GB)

( * ) Notice: Subject to any disclaimer, the term of this patent is extended or adjusted under 35 U.S.C. 154(b) by 261 days.

(21) Appl. No.: 17/060,309

(22) Filed: Oct. 1, 2020

(65) Prior Publication Data
US 2021/0104112 A1 Apr. 8, 2021

(30) Foreign Application Priority Data
Oct. 3, 2019 (GB) ...................... 1914262

(51) Int. Cl.
*B41M 3/14* (2006.01)
*G07D 7/1205* (2016.01)
(Continued)

(52) U.S. Cl.
CPC ............. *G07D 7/1205* (2017.05); *B41M 3/14* (2013.01); *B42D 25/36* (2014.10); *B82Y 20/00* (2013.01); *B82Y 30/00* (2013.01); *G07D 7/121* (2013.01)

(58) Field of Classification Search
CPC ....... G07D 7/1205; G07D 7/121; B41M 3/14; B42D 25/36; B82Y 30/00; B82Y 20/00;
(Continued)

(56) References Cited

U.S. PATENT DOCUMENTS

2007/0205284 A1* 9/2007 Ross ................ G06K 19/06046
235/468
2012/0256409 A1* 10/2012 Giering .............. C09K 11/7771
283/85
(Continued)

FOREIGN PATENT DOCUMENTS

RU 2222002 C2 1/2004

OTHER PUBLICATIONS

GB Search Report for corresponding GB Application No. 1914262.9 dated Mar. 23, 2020, 1 page.

*Primary Examiner* — David P Porta
*Assistant Examiner* — Mamadou Faye
(74) *Attorney, Agent, or Firm* — Hoffman Warnick LLC

(57) ABSTRACT

According to a first aspect of the invention, there is provided a method of deriving information from an optically readable security element, comprising: optically reading the optically readable security element, the optically readable security element comprising at least one optically readable structure, optically readable in response to excitation of the optically readable structure; the reading comprising determining data indicative of an optical property of the optically readable security element using first emission electromagnetic radiation, emitted in response to excitation of the optically readable structure; the deriving information further comprising using the determined data indicative of an optical property, in combination with a temporal excitation-emission relationship related to the optically readable structure, to derive the information.

20 Claims, 7 Drawing Sheets

(51) Int. Cl.
*B42D 25/36* (2014.01)
*B82Y 20/00* (2011.01)
*B82Y 30/00* (2011.01)
*G07D 7/121* (2016.01)

(58) Field of Classification Search
CPC .. H04L 9/3278; G09C 1/00; G06K 19/06046; G01N 21/64; G06V 20/80
See application file for complete search history.

(56) References Cited

U.S. PATENT DOCUMENTS

| | | | |
|---|---|---|---|
| 2013/0075692 A1* | 3/2013 | Naasani | H01L 33/501 257/E33.059 |
| 2013/0122266 A1* | 5/2013 | Kane | B42D 25/21 252/301.36 |
| 2013/0193346 A1 | 8/2013 | Jüstel et al. | |
| 2014/0097359 A1* | 4/2014 | Vasic | G01J 1/58 250/206 |
| 2015/0191038 A1 | 7/2015 | Giering et al. | |

* cited by examiner

DERIVING INFORMATION FROM AN OPTICALLY READABLE SECURITY ELEMENT

The present invention relates generally to a method of deriving information from an optically readable security element, to a related system, and also to related methods and systems for determining a temporal excitation-emission relationship for an optically readable security element, for example for use in the method and system for deriving information. The invention also relates to a related optically readable security element.

Optically readable security elements are known, for example in the form of holograms, bar codes, 2D codes (such as QR codes), and so on. The security provided by such an element might range from the provision of a unique identifier, or to provide or prove a degree of authentication of the element or a device to which the element is attached. The security element might provide a link or pointer to other information associated with the element or the device to which the element is attached or of which the element forms a part.

Some optically readable security elements have been proposed which incorporate the use of one or more optically readable structures, optically readable in response to excitation of the optically readable structure. For instance, the optically readable structure might take the form of a quantum dot, or molecules of fluorescent material. These structures would be readable in some way in order to derive information from the structures, and the element as a whole, to provide the required security, for example the unique ID, or embedded data, and so on. However, there is a well-known problem associated with the use of such optically readable structures (i.e. optical emitters). In brief, the problem is that their optical performance degrades over time, in that the structures exhibit a somewhat negative or degrading temporal excitation-emission relationship.

In perhaps more conventional display technology, where for example quantum dots or organic light-emitting diodes are used, a degradation in optical performance over time is a serious problem, for example degrading image quality over time, to the extent that image quality becomes poor, or the related display device becomes unusable. It may therefore be at least partially assumed that the same or similar problems would be prevalent in existing or proposed optically readable security elements employing the use of the same or similar optically readable structures. That is, over time, inherent excitation-emission relationships may be such that there is a degradation which reduces or avoids any security which the elements would otherwise provide, which interferes with the operation of such a security element.

It is an example aim of example embodiments of the present invention to at least partially avoid or overcome one or more disadvantages of the prior art, whether identified herein or elsewhere, or at least to provide a viable alternative to prior art methods and apparatus.

According to the present invention there is provided an apparatus and method as set forth in the appended claims. Other features of the invention will be apparent from the dependent claims, and the description which follows.

According to a first aspect of the invention, there is provided a method of deriving information from an optically readable security element, comprising: optically reading the optically readable security element, the optically readable security element comprising at least one optically readable structure, optically readable in response to excitation of the optically readable structure; the reading comprising determining data indicative of an optical property of the optically readable security element using first emission electromagnetic radiation, emitted in response to excitation of the optically readable structure; the deriving information further comprising using the determined data indicative of an optical property, in combination with a temporal excitation-emission relationship related to the optically readable structure, to derive the information.

The optically readable security element may comprise a first optically readable structure, optically readable in response to excitation of the first optically readable structure, and having a first temporal excitation-emission relationship; and a second optically readable structure, optically readable in response to excitation of the second optically readable structure, and having a second temporal excitation-emission relationship The reading may comprise determining data indicative of an optical property of the optically readable security element using first emission electromagnetic radiation, emitted in response to excitation of the first optically readable structure, and determining data indicative of an optical property of the optically readable security element using second emission electromagnetic radiation, emitted in response to excitation of the second optically readable structure.

The deriving information may further comprise using the determined data indicative of an optical property determined from each of the first and second optically readable structures, in combination with the first and second temporal excitation-emission relationships related to the first and second optically readable structures, to derive the information.

The deriving information may comprise: comparing the determined data of the optically readable structure with the temporal excitation-emission relationship.

The deriving information may comprise: comparing the determined data of the first optically readable structure with the first temporal excitation-emission relationship; and comparing the determined data of the second optically readable structure with the second temporal excitation-emission relationship.

The deriving information may comprise: comparing a difference between the determined data for the first optically readable structure and the second optically readable structure, with a difference between the first temporal excitation-emission relationship and the second temporal excitation-emission relationship.

The derived information may relate to an age of the optically readable security element.

The derived information may relate to a deviation from an expected temporal excitation-emission relationship.

A or the deviation from an expected temporal excitation-emission relationship may be indicative of one or more of: exposure of the optically readable security element to environmental factors different to those for which the expected temporal excitation-emission relationship was established; or tampering with the optically readable security element; or a non-authentic optically readable security element.

The derived information may relate to a correction factor to be applied to a reading of the optically readable security element.

The derived information may relate to a correction factor to be applied to a reading of the optically readable security element, based on an age of the optically readable security element based on the derived information.

The derived information may relate to a correction factor to be applied to a reading of the optically readable security element, based on a deviation from an expected temporal excitation-emission relationship based on the derived information.

The derived information may relate to verifying that the at least one optical structure is a quantum system and complex at the atomic scale.

The at least one optical structure may comprise one or more continuous or discrete components exhibiting quantum mechanical confinement.

The or each structure or component may be capable of emitting electromagnetic radiation linked to quantum mechanical confinement provided by the structure or component. The emission is in response to the excitation.

The at least one optical structure may comprise one or more continuous or discrete components exhibiting quantum mechanical confinement, and the confinement may be in one or more of three (e.g. a quantum dot), two (e.g. a quantum wire) or one (e.g. a quantum well) spatial dimensions.

The reading may be undertaken for multiple locations across the security element.

The reading may be undertaken for multiple locations across the security element, at the same time.

The reading may be undertaken for multiple locations across the security element, at the same time, using a 2D sensor.

The method may additionally comprise using the reading to determine a unique identifier for the optically readable security element.

The method may additionally comprise using the reading to determine a unique identifier for the optically readable security element, using one or more excitation-emission relationships, for one or more optically readable structures, in one or more locations of the security element.

The method may additionally comprise using the reading to determine a unique identifier for the optically readable security element, using the derived information, for one or more optically readable structures, in one or more locations of the security element.

The method may additionally comprise using the reading to determine a unique identifier for the optically readable security element, using one or more excitation-emission relationships, for one or more optically readable structures, in one or more locations of the security element, and using the derived information, for one or more optically readable structures, in one or more locations of the security element.

According to a second aspect of the invention, there is provided a system for deriving information from an optically readable security element, comprising: an optical reader, for optically reading the optically readable security element, the optically readable security element comprising at least one optically readable structure, optically readable in response to excitation of the optically readable structure; the reading comprising determining data indicative of an optical property of the optically readable security element using first emission electromagnetic radiation, emitted in response to excitation of the optically readable structure; the system being arranged to use the determined data indicative of an optical property, in combination with a temporal excitation-emission relationship related to the optically readable structure, to derive the information.

According to a third aspect of the invention, there is provided a method of determining a temporal excitation-emission relationship for an optically readable security element, the method comprising: optically reading the optically readable security element, the optically readable security element comprising at least one optically readable structure, optically readable in response to excitation of the optically readable structure; the reading comprising determining data indicative of an optical property of the optically readable security element using first emission electromagnetic radiation, emitted in response to excitation of the optically readable structure at a first time, and determining data indicative of an optical property of the optically readable security element using second emission electromagnetic radiation, emitted in response to excitation of the optically readable structure at a second, later time; and the temporal excitation-emission relationship being determined from a variation in determined data indicative of an optical property with respect to the excitation of the optically readable structure from the first time to the second time, such that, at a third, later time, information from an at least related optically readable security element can be derived from said related optically readable security element by determining data indicative of an optical property of the related optically readable security element using third emission electromagnetic radiation, emitted in response to excitation of the related optically readable structure, the deriving information comprising using the determined data indicative of an optical property, in combination with the temporal excitation-emission relationship related to the optically readable structure, to derive the information.

The method might involve storing data at least indicative of the determined temporal excitation-emission relationship, for use at the third, later time.

The method might involve assigning an identifier for data at least indicative of the determined temporal excitation-emission relationship, for use at the third, later time. The identifier will link the relationship to the security element or a related security element.

According to a fourth aspect of the invention, there is provided a system for determining a temporal excitation-emission relationship for an optically readable security element, comprising: an optical reader, for optically reading the optically readable security element, the optically readable security element comprising at least one optically readable structure, optically readable in response to excitation of the optically readable structure; the reading comprising determining data indicative of an optical property of the optically readable security element using first emission electromagnetic radiation, emitted in response to excitation of the optically readable structure at a first time, and determining data indicative of an optical property of the optically readable security element using second emission electromagnetic radiation, emitted in response to excitation of the optically readable structure at a second, later time; and the system being arranged to determine the temporal excitation-emission relationship from a variation in determined data indicative of an optical property with respect to the excitation of the optically readable structure from the first time to the second time, such that, at a third, later time, information from an at least related optically readable security element can be derived from said related optically readable security element by determining data indicative of an optical property of the related optically readable security element using third emission electromagnetic radiation, emitted in response to excitation of the related optically readable structure, the deriving information comprising using the determined data indicative of an optical property, in combination with the temporal excitation-emission relationship related to the optically readable structure, to derive the information.

According to a fifth aspect of the invention, there is provided a optically readable security element from which information is derivable, comprising: at least one optically readable structure, optically readable in response to excitation of the optically readable structure; the optically readable structure having a related, and known, temporal excitation-emission relationship; the optically readable security element being readable to determine data indicative of an optical property of the optically readable security element using first emission electromagnetic radiation, emitted in response to excitation of the optically readable structure; in use, the deriving information comprising using the determined data indicative of an optical property, in combination with the known, temporal excitation-emission relationship related to the optically readable structure, to derive the information The optically readable security element may comprise a capping layer for the optically readable structure.

It will be appreciated that any one or more features of one or more of the aspects or embodiments described herein may be used in combination with, or in place of, any one or more features of another aspect or embodiment of the invention as described herein, unless such combination or replacement would be understood by the skilled person to be mutually exclusive after a reading of this disclosure. For instance, and in particular, any feature described in relation to a method-like aspect or embodiment may be used in combination with or in place of one or more features of an apparatus-like aspect or embodiment, and the other way around.

For a better understanding of the invention, and to show how embodiments of the same may be carried into effect, reference will now be made, by way of example, to the accompanying diagrammatic Figures in which:

FIG. 1 schematically depicts an optical reader, optically reading an optically readable security element, in accordance with an example embodiment;

FIGS. 2 and 3 schematically depict different types of optically readable security elements, in accordance to the example embodiments;

FIGS. 4 and 5 schematically depict more simplistic views of the optically readable security elements of FIGS. 2 and 3, respectively;

FIG. 6 schematically depicts a visual representation of a degradation in excitation-emission performance of an optically readable security element over time;

Figure 10:
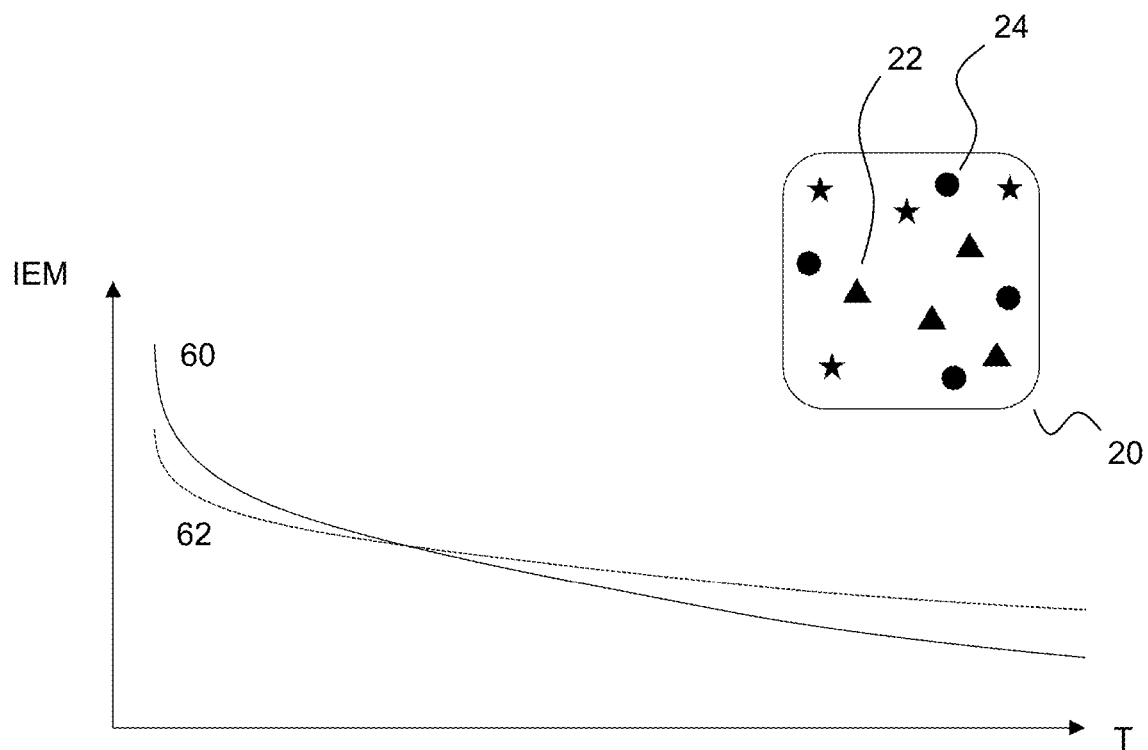
Figure 11:
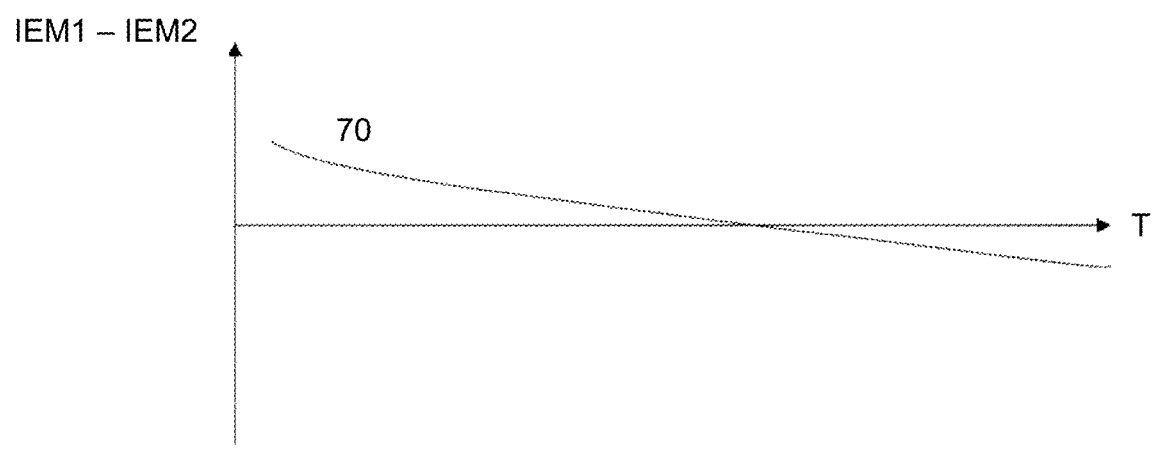
Figure 12:
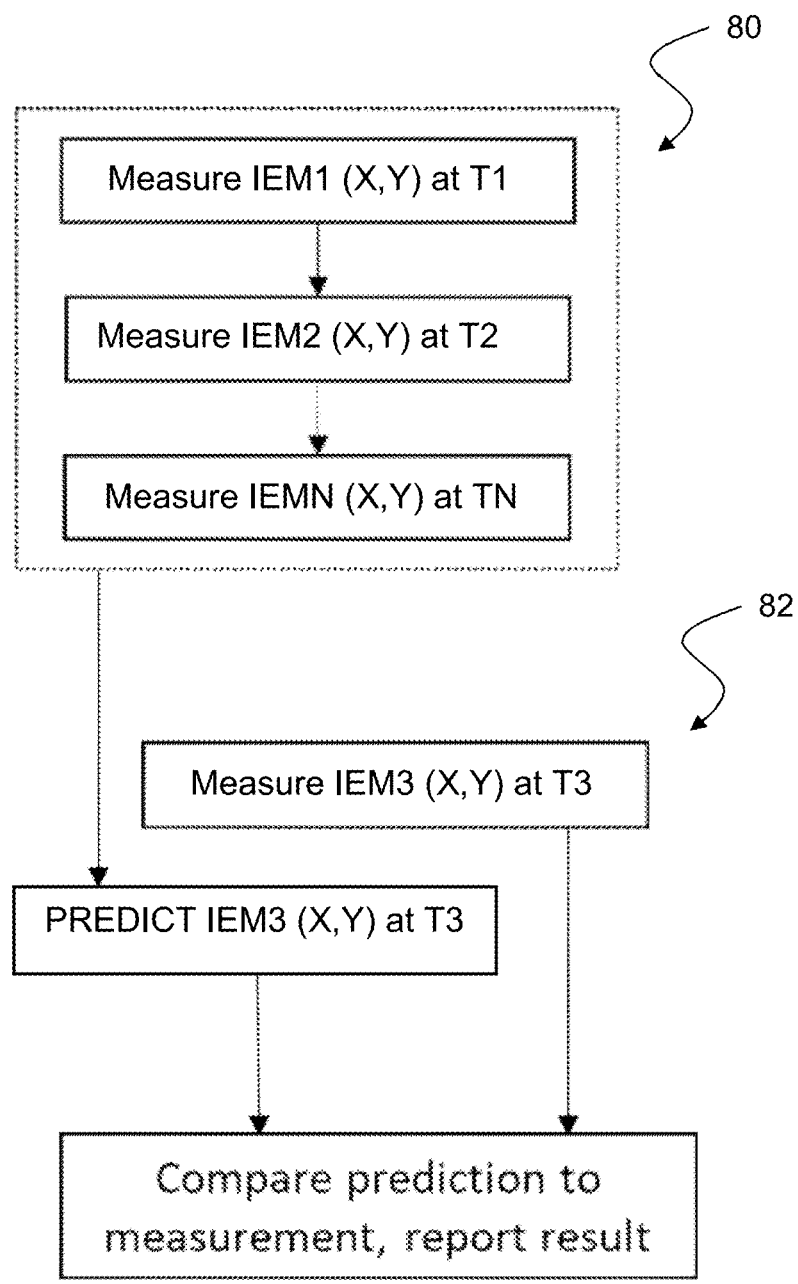
Figure 13:
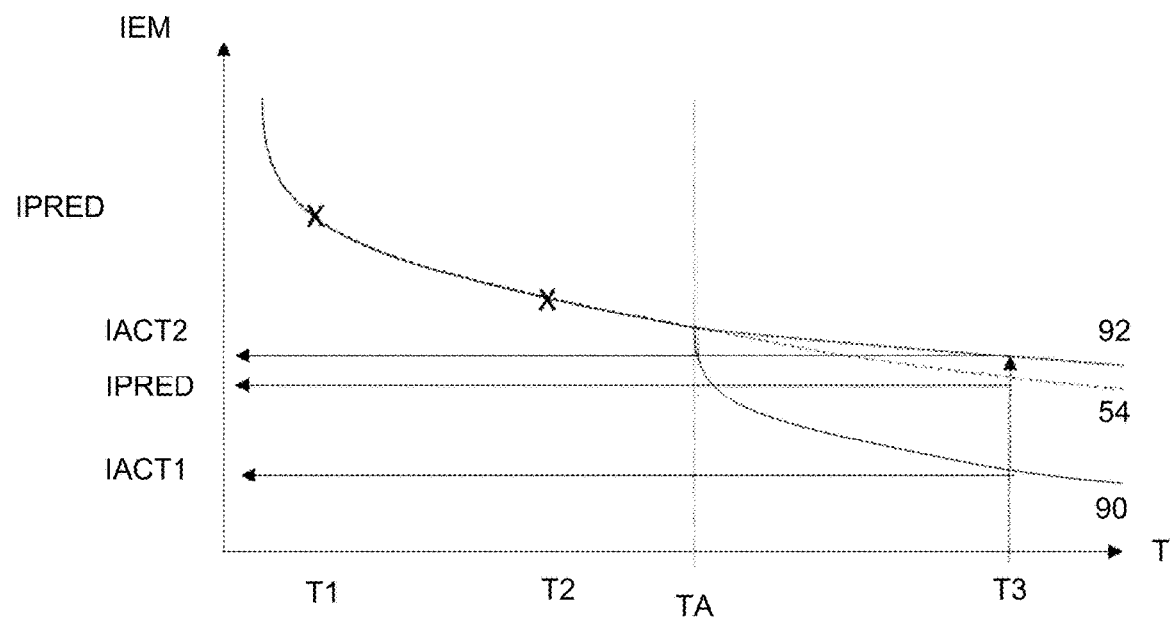
Figure 14:
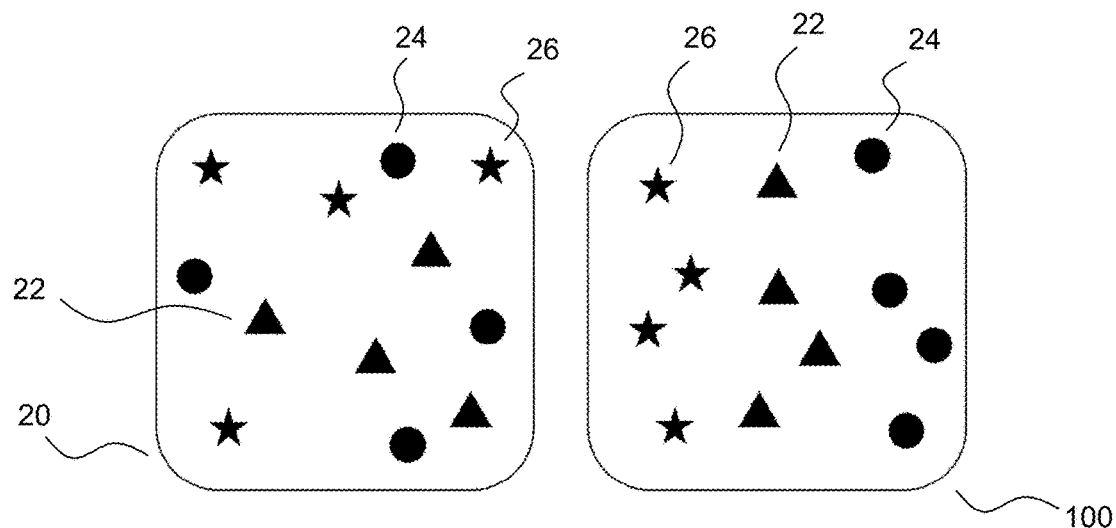
Figure 15:
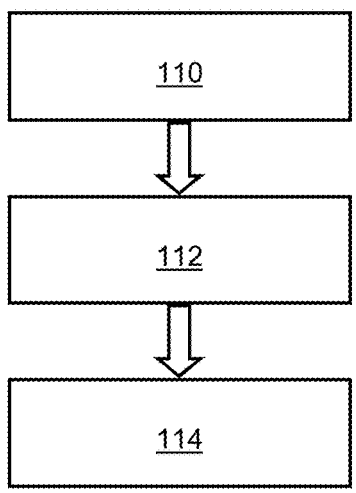
Figure 16:
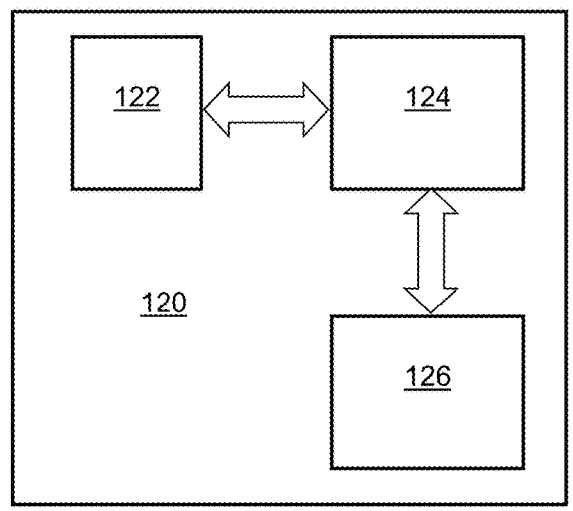
Figure 17:
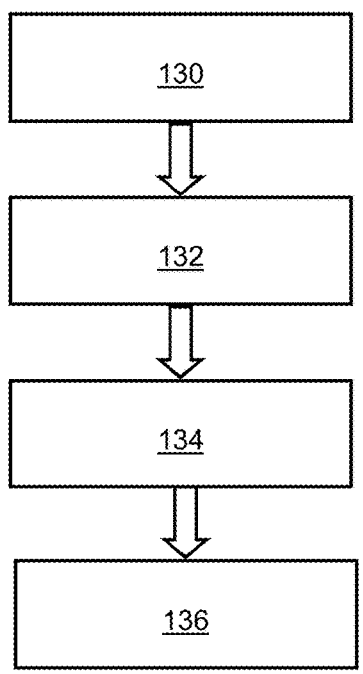
Figure 18:
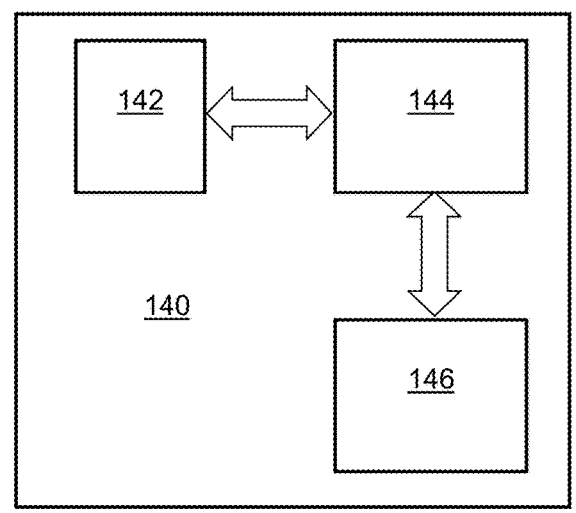
Figure 19:
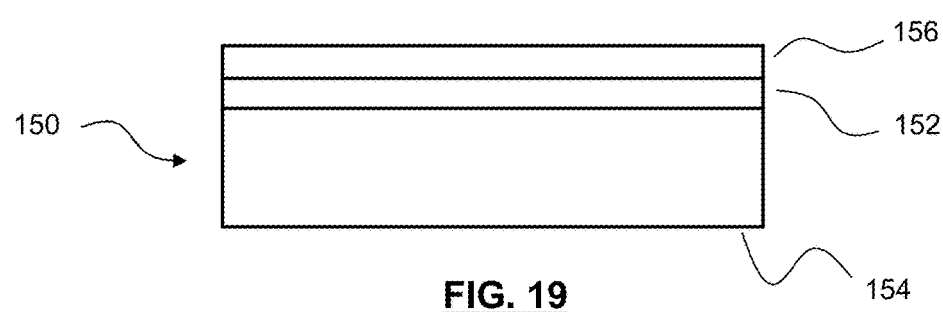

FIG. 10 schematically depicts temporal excitation-emission relationships for two different optically readable structures;

FIG. 11 is a graph schematically depicting a difference between the different temporal excitation-emission relationships of FIG. 10;

FIG. 12 schematically depicts methodology for deriving information from an optically readable security element, using read and determined data indicative of an optical property of a structure of the element, in combination with a related temporal excitation-emission relationship;

FIG. 13 is a graph schematically depicting different types of information that can be derived from an optically readable security element, using read data and a related temporal excitation-emission relationship, in accordance to example embodiments;

FIG. 14 schematically depicts different distributions of optically readable structures of optically readable security elements, in accordance with example embodiments;

FIG. 15 schematically depicts general methodology associated with example embodiments;

FIG. 16 schematically depicts general apparatus principles associated with example embodiments;

FIG. 17 schematically depicts general methodology associated with example embodiments;

FIG. 18 schematically depicts general apparatus principles associated with example embodiments; and FIG. 19 schematically depicts an optically readable security element in accordance to an example embodiment.

Figure 1:
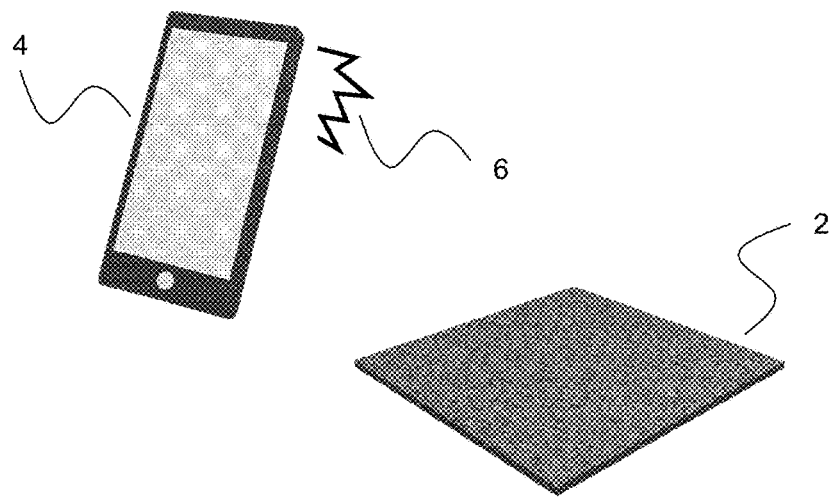

FIG. 1 schematically depicts an optically readable security element 2 comprising a number of optically readable structures, optically readable in response to excitation of the optically readable structures.

The optically readable structures (i.e. optical emitters) could take one of a number of different forms. However, one advantageous form is when the optical structure comprises one or more continuous or discrete components exhibiting quantum mechanical confinement, the or each component being capable of emitting electromagnetic radiation linked to that quantum mechanical confinement, in response to the excitation. The confinement of the one or more continuous or discrete components might be in one or more of three (e.g. a quantum dot), two (e.g. a quantum wire) or one (e.g. a quantum well) spatial dimensions. For instance, the optically readable structure might take the form of quantum dots, flakes of material, flakes of 2D material, nanowires, and so on. Such structures, exhibiting quantum mechanical confinement, are advantageous since their placement and distribution on an element, and unique interactions with components of the elements, mean that they can exhibit an easily readable, but very difficult to copy, configuration. For instance, the reading may be undertaken using relatively simple excitation and reading means, yet the security provided may be particularly rich and complex, since it may be very difficult, if not impossible, to easily spoof or replicate the physical location and excitation-emission relationships of such structures. The excitation of such structures could be, for instance, via an electrical input, or an optical (e.g. electromagnetic radiation) input. Both may be satisfactory, but it is envisaged that optical excitation with excitation electromagnetic radiation would be a far more versatile and user-friendly approach, such that, for example, a mobile telephone or tablet could excite and read the security element.

Referring back to FIG. 1, an optical reader is shown in the form of a mobile telephone or tablet device 4. Reading of the optically readable security element 2 with the reader 4 is undertaken using a camera or other sensor provided in the reader 4. Excitation of optically readable structures of the optically readable security element 2 may be undertaken using electrical stimulation of the optically readable security element 2, or via optical excitation. Optical excitation may be, for example via ambient light, or more likely via one or more controllable electromagnetic radiation sources of or associated with the reader 4, for example via a flash 6 or another light source.

Figure 2:
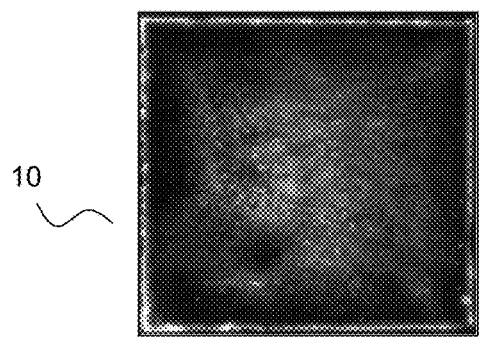
Figure 3:
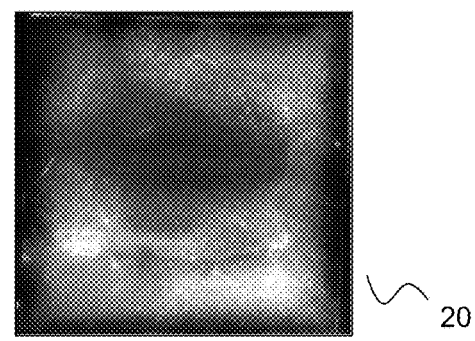

FIG. 2 shows a plan view of an optically readable security element 10 provided with optically readable structures of only a single type, distributed randomly across the element. In contrast, FIG. 3 shows a different optical readable security element 20, with a number (greater than one) of different optical readable structures distributed randomly across the element.

Figure 4:
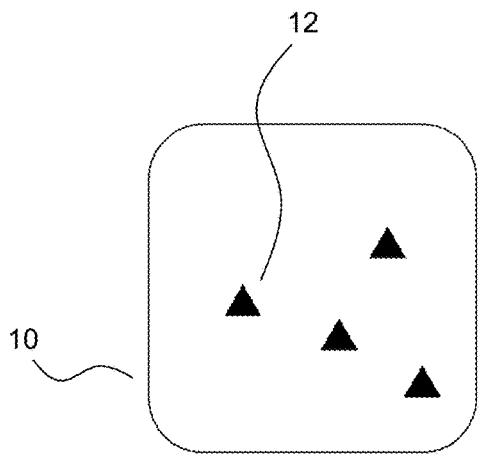
Figure 5:
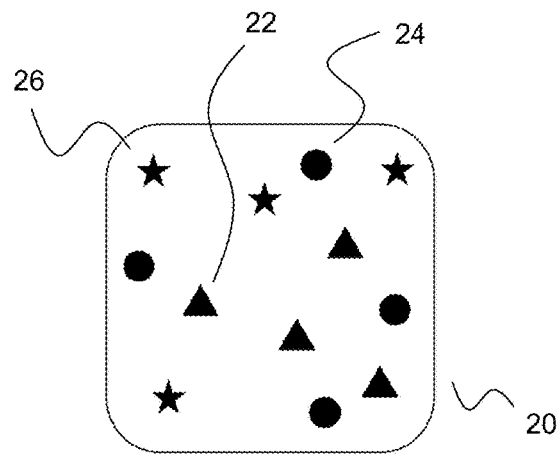

FIG. 4 is a more schematic view of the element 10 of FIG. 2, and shows, in crude simplistic form, a distribution of a first type of optically readable structure 12. Similarly, FIG. 5 relates to FIG. 3, but shows, in more simplistic form, a distribution of three different types of optically readable structure 22, 24, 26.

FIGS. 2 to 5 show that various different implementations of optically readable security elements may be realised, using one or more different types of optically readable structures, for example distributed across the elements. Reading of the structures, for example the excitation-emission relationship of one or more optically readable structures, typically in more than one location, can be used in association with a degree of security that the element provides, as discussed above. For instance, the relationship might be used to determine a unique identifier, which includes confirming or authenticating such an identifier, and might in some way provide some embedded data associated with the element or an object to which the element is attached, and so on.

Figure 6:
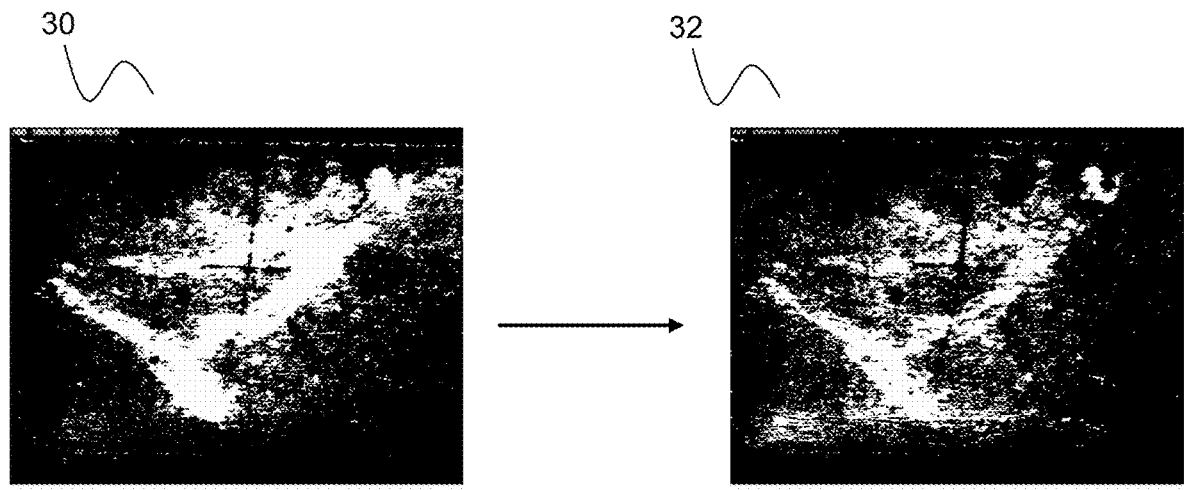

FIG. 6 shows an optical reading of an optically readable security element in accordance with an example embodiment, at a first time 30. The same element is then shown when read at a second time 32. It can be seen that the results of the reading have changed in that, in simplistic terms, the excitation-emission relationship has in some way changed between the first time 30 and the second time 32. Typically, as alluded to above, this is due to a degradation in the excitation-emission relationship over time, as in the same excitation at the first time, and the second time, leads to a lower intensity emission at the second time. This degradation or more generally change in temporal excitation-emission characteristic, is typically not random but is quantitatively definable as following a set pattern or relationship.

Figure 7:
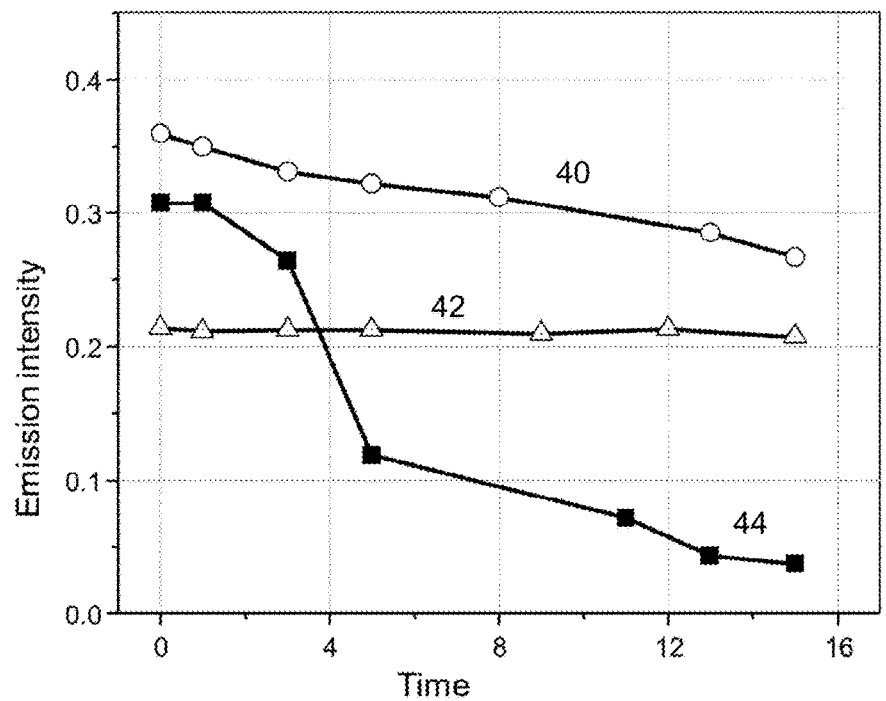
FIG. 7 is a graph showing different temporal excitation-emission relationships for different optically readable structures.

FIG. 7 is a graph showing temporal excitation-emission relationships for three different optically readable structures 40, 42, 44. It can readily be seen that each temporal excitation-emission relationship 40, 42, 44 is, while different, consistent in terms of showing a decay in performance over time. For instance, a first optically readable structure 40 exhibits a generally slow and steady decay over time, whereas the second optically readable structure 42 has a performance that is only very slightly reduced over the measured time period. In contrast, the third optically readable structure 44 has a very fast decay, losing over 50% of intensity (e.g. for a normalised excitation) relatively rapidly, before beginning to stabilise.

As discussed above, the negative or degrading temporal excitation-emission relationships shown in FIGS. 6 and 7 are typically viewed as problematic in existing methods and systems. Indeed, a large amount of time and effort has gone into research and development to prevent or limit such degradation over time, especially in consumer display technologies. This is entirely understandable. However, and in contrast to all existing approaches, the inventors of the present application have realised that such temporal excitation-emission relationships are not in fact problematic. In fact, these relationships are very advantageous. They are advantageous, in that the relationships, for example those shown in FIG. 7, can be used in combination with a reading of related optically readable structures in order to derive additional information from the optically readable security element (e.g. separate to and different from the actual temporal excitation-emission relationship itself, and/or the reading itself).

The information that is derivable is not arbitrary, but is potentially extremely useful and powerful, including an indication of an age of the optically readable security element, or (via deviation from an expected or predicted temporal excitation-emission relationship) an indication of exposure of the optically readable security element to environmental factors different to those for which the relationship was established, or indicating tampering with or of the optically readable security element, or the read element not being an authentic or expected optically readable security element. The same reading and information can be used to apply a correction factor when reading the optical security element, for example in subsequent readings, for example based on an age of the element that is derived from the reading and the relationship, or from a deviation from an expected temporal relationship based on the information that is derived. Significantly, the information may relate to verifying that the at least one optical structure is a quantum system and complex at least on atomic scale, for example by confirming that the reading matches with a predicted temporal excitation-emission relationship, that relationship being unique to that particular quantum system and its complexity at the atomic scale.

Figure 8:
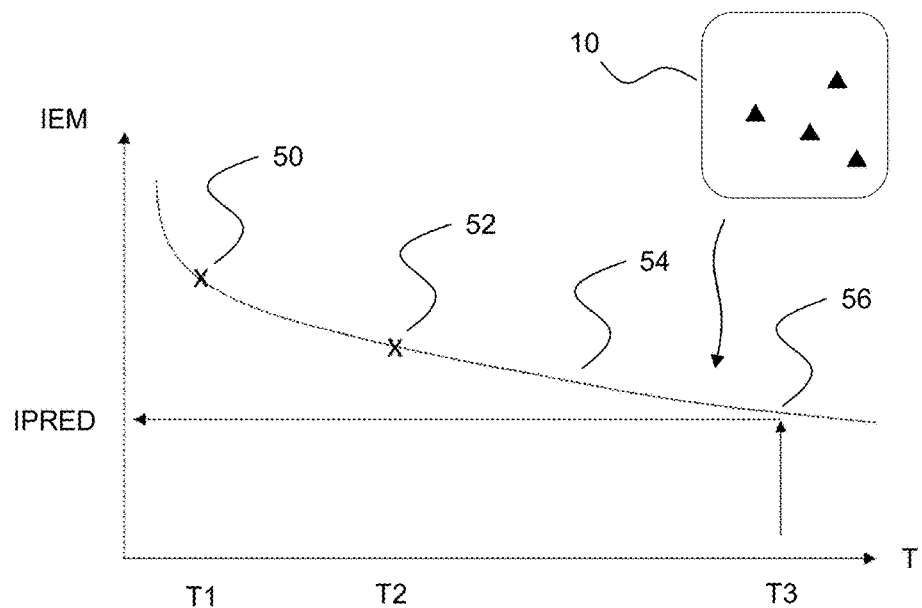
FIG. 8 is a graph schematically depicting the use of a temporal excitation-emission relationship to derive information from an optically readable security element, in accordance with an example embodiment.

FIG. 8 is a graph showing a temporal excitation-emission characteristic for an optically readable structure, in terms of intensity of emission IEM over time T (for a given, normalised set of excitation criteria).

The optically readable structure that is read could be a single structure, or one of a number of structures having the same excitation-emission characteristics, for example as shown in FIGS. 2 and 4. Alternatively, as described in later examples, more than one type of optically readable structure could be present in the optically readable security element.

Referring back to FIG. 8, the graph shows that a reading of the optically readable security element comprises determining data indicative of an optical property of the optically readable security element using emission electromagnetic radiation, emitted in response to excitation of the optically readable structure at a first time T1. The reading is repeated at a second, later time T2. This yields two readings 50, 52 at different times T1, T2. Of course, more readings may be taken if needed.

The readings shown so far in relation to FIG. 8 are typically to be undertaken as part of a calibration or base line measurement, for example when the security element is constructed, prior to the security element being released for general use. Indeed, readings may be undertaken of a base line or reference optically readable security element, for example being very similar or identical to those elements that are to be released for general use, for example made in the same batch and so on. Or, each and every element that is released for general use may be read and calibrated for, in advance of such general use. Many different implementations are possible.

The readings 50, 52 at times T1, T2 are used to establish a temporal excitation-emission relationship 54. This can be achieved by implementing a numerical fit 54 using the measurements 50, 52. As discussed above, a temporal excitation-emission relationship 54 is not problematic according to example embodiments. Instead, the relationship 54 is useful. For instance, FIG. 8 shows that a prediction IPRED of intensity of emission at some later time T3 can be made, using that relationship 54. If a reading 56 at that time T3 (using the same excitation conditions, or with some form of normalisation) does or does not match the predicted intensity of emission IPRED, then information can be derived from the reading, and the optically readable security element, accordingly. For instance, the fact that the reading 56 matches the prediction IPRED might be sufficient to authenticate the optically readable security element, or to identify the optically readable security element, using the relationship 54. Or, if the reading deviates from the predicted or expected result, then that information is also useful.

In other words, then, information separate and in addition to the temporal excitation-emission relationship itself can be derived from the optically readable security elements, by using determined data indicative of an optical property of optically read structures of the elements (e.g. an intensity of emission), in combination with that temporal excitation-emission relationship.

When the optically readable security element is read, for example in order to derive information from that element, the temporal excitation-emission relationship with which comparisons or the like are to be made may already be known, or generally assumed to be of a particular form. For instance, a particular company might fabricate or be provided with a vast number of optically read readable security elements for use with their products. A subsequent user of those products, wishing to derive information from the optically read security element via a reading of the elements might undertake this reading using a particularly dedicated or branded reader or reader software, for example from a dedicated application. In a basic example, a user may want to read an optically readable security element on a product from 'company X' using an application installed on a mobile telephone that has been downloaded from that same 'company X'. In these sorts of scenarios, the required temporal excitation-emission relationships required to derive information from the optically readable security elements can be known in advance of any reading.

In another example, deriving information from a reading of an optically readable security element might additionally comprise identifying the required temporal excitation-emission relationship that is to be used in combination with the reading to extract the additional information from the optically readable security element. Such identification or, more generally, access, might be achieved in one of a number of different ways. In one example, a general pattern or distribution of one or more optically readable structures of the optically readable security elements may be sufficient to provide an identifier which may be used to identify the security element, or the type of security elements, which can then be cross-referenced to access or otherwise obtain information relating to the required temporal excitation-emission relationship. In another example, the reader may be configured to read a different code provided next to, or part of, the optically readable security element, or its optically readable structures, for example a number, or code, for example a bar code, or QR code and so on. In another example, the element may be provided with one or more structures that are more consistently or reliably variable over time, in terms of excitation-emission relationships, to serve as a baseline against measurements of variance in other (e.g. more variable) excitation-emission relationships of other structures.

In summary, then, the temporal excitation-emission relationships required to derive information from a reading of the optically readable security element can readily be determined, in one of a number of different ways, or already assumed to be known, depending on the application in question.

Figure 9:
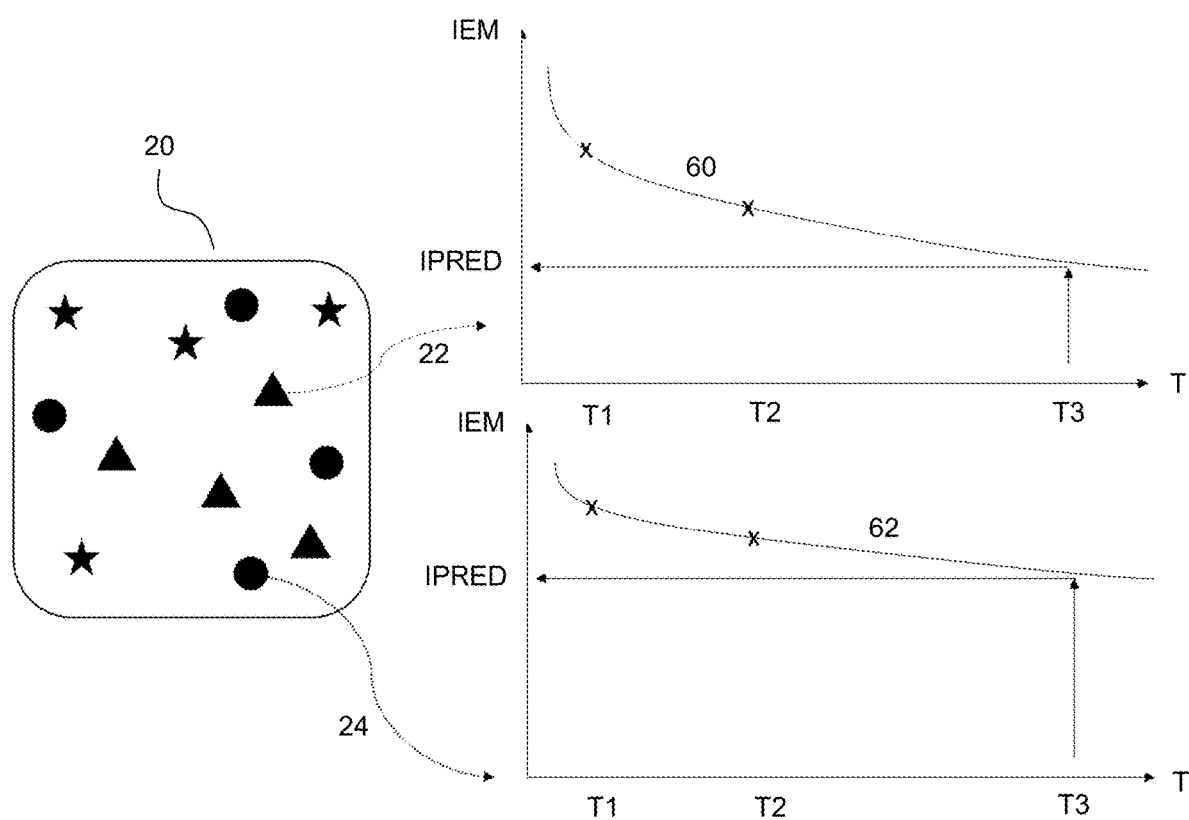
FIG. 9 is an extension of the principles shown in and described with reference to FIG. 8, but for a number of different optically readable structures having different temporal excitation-emission relationships.

FIG. 9 shows similar graphs to the single graph shown in FIG. 8. However, instead of temporal excitation-emission relationships being established for an optically readable security element comprising a single, or a single type, of optically readable structure, FIG. 9 shows a situation for elements having more than one type of optically readable structure, such as the elements shown in and as described with reference to FIGS. 3 and 5.

With regards to FIG. 9, many of the same principles apply as already shown in and as described with reference to FIG. 8. However, when more than one type of optically readable structure is used, the additional relationships that are associated with the multiple structures might provide additional richness in terms of information that can be extracted from the optically readable security element, or functionality in terms of how that information can be extracted. Key, then, from an understanding of FIG. 9, is that two temporal excitation-emission relationships 60, 62 are established, for different types of optically readable structures.

FIG. 10 is a graph, showing the two temporal excitation-emission relationships 60, 62 derived in accordance with the principles shown in FIGS. 8 and 9, whereby first, and second, optically readable structures are read at different times to establish or determine a related and associated temporal excitation-emission relationship for each structure.

It will be appreciated that the relationships 60, 62 shown in FIG. 10 may be used in isolation, for example replicating the principles already shown in relation to the single optically readable structure concept of FIG. 8, but now with two different types of optically readable structure. This might provide redundancy, or further information, and so on. For instance, subsequent readings of a first structure may comprise comparing determined data with the associated temporal excitation-emission relationship 60, and the same may be done for the second optically readable structure and its associated relationship 62.

Following on from FIG. 10, the use of multiple excitation-emission relationships has at least one additional benefit. FIG. 11 demonstrates this. FIG. 11 is a graph showing a difference 70 between the first and second excitation-emission relationships of FIG. 10. This is a subtle but powerful feature, since this means that by comparing the intensity of emission of the different optically readable structures, the age of the optically readable structure or optically readable security element can be determined. This is an age from fabrication, or an age or time from when a relationship for the structure was determined.

This implementation may be easier to implement in terms of being able to quickly and easily read and compare intensity measurements, as opposed to needing to separately undertake such readings and measurements and comparisons for multiple different relationships and so on. Also, it may be possible to implement this methodology with no need to ever have any access to any actual temporal-excitation emission relationship. This is more secure, since only the difference between relationships is needed, and the difference only relates to the relationship, but does not reveal the actual relationships.

An example implementation method is now described in FIG. 12, summarising or elaborating on some of the previous concepts. There is an initial calibration, or set up, phase 80. In this phase, multiple measurements are taken by undertaking multiple readings of optically readable structures of an optically readable security element. Measurements IEM1, IEM2, to IEMN are undertaken in sufficient number and separated by sufficient time, in order to be able to determine or otherwise establish a satisfactory numerical fit of the measurements, for determining a temporal excitation-emission relationship for future use. It is this relationship which enables the prediction of future excitation-emission behaviour to be established and used.

If there is more than one type of optically readable structure provided in or on the optically readable security element, the same process may be undertaken for the different types of structures or emitters, for example so that differential processing or analysis can be formed at some later point in time, for example as show in relation to FIG. 11.

At this stage, the security element, and/or the relationship derived from the element or associated structures, may be assigned a unique identifier, against which subsequent measured emissions and predicted performance or emissions are recorded. This provides a reference set of measurements and/or a reference security element. At this point, it is important to note that it may well be that this very same optically read security element is the element that is then released, for example from a manufacturing environment, to a user environment, and for which subsequent readings may be undertaken. However, in another example, it may be that the initial reference measurements are undertaken from one of a batch of related elements, and only certain elements of the batch are released for user exposure and interaction, and one or more elements of the batch are kept, for example in a controlled environment as a reference sample and so on.

Referring back to FIG. 12, next, the (or a closely related) optically readable security element is available for use, for example by a user outside of and separate to the reference environment 82. In this phase, the user may use an optical reader to undertake a reading IEM3 at what would be a later time, T3. The measurements may then be used in combination with the prediction from the determined temporal excitation-emission relationship, so that a comparison may be made between the two, and information derived from that comparison.

As discussed above, the derivation information could take a wide range of forms. In one example, the measurements are compared with reference measurements, and the comparison can be used to correct for aging of the optically readable security elements, for instance by applying a gain or correction factor to the measured intensity, such that the intensity at each point within a sample can be normalised and used to extract fingerprint information (more generally, an identifier) to authenticate against historical fingerprint (ID) information. In another example, the measure of aging may be used to authenticate the presence of certain optically readable structures, where age and behaviour are particular to that type of structure. A further scenario might involve the measurement comparison being used to ascertain the age of the sample. A further scenario might involve the measurement comparison being used to assess whether or not the optically readable security element has been exposed to adverse environmental conditions, or at least environmental conditions different to those in which the referenced measurements and results were established. For example, if the age of the element is known, and the measurement reveals a deviation from a prediction, the deviation is highly likely to be associated with exposure to environmental conditions different to those reference conditions for which the reference relationship was established. If the environment of the element is known, and is known or can be assumed for its time since manufacture, and the measurement reveals a deviation from a prediction, the deviation is highly likely to be associated with general ageing of the element. The use of the relationships, and confirmation of fitting with these measurements, might itself be used as a way of identifying the security element as an authentic security element. For example, tampering, or attempting to spoof the readings with a counterfeit element, would fail the reading and comparison tests.

It will thus be appreciated that, instead of the degradation in excitation-emission performance being a problem, there are many different advantages associated with using the relationship to derive additional information from an optically readable security element.

It will be appreciated that the reading of the optically readable security element could be undertaken at a single particular location, both in the establishment of reference measurements and in the subsequent use and reading of the element or a related element. However, there may be advantages in reading the elements at multiple locations (X, Y) along and/or across its length and width. This might be advantageous in obtaining more accurate measurements or readings, or comparisons against established relationships, simply because multiple measurements are taken from multiple locations on the element. In a related example, taking measurements from multiple locations across the element might allow for a spatial fingerprint or unique identifier to be determined in addition to, in parallel with, or as part of the comparison of reading of the optical structures in combination with use of the temporal excitation-emission relationships.

FIG. 13 includes the single excitation-emission relationship 54 for a single type of optically readable structure as already shown in and as described with reference to FIG. 8. However, this Figure also shows multiple uses of this relationship 54, and how different types of information can be derived from reading of an optically readable security element having optical structures with such a relationship 54.

At time TA (an arbitrary time after initial calibration/reference measurement T2) the optically readable security element has been exposed to adverse environmental conditions, which has led to accelerated aging relative to the prediction IPRED when read at later time T3. This is shown in the graph as measured, actual intensity IACT1 being different from the predicted intensity IPRED. The dotted/dash line indicates the expected or reference temporal excitation-emission relationship 54 that would have been evident in the event of the optically readable security element not being exposed to such adverse environmental conditions. Of course, there may be some degree of error, or margin, or tolerance, within which discrepancies might be acceptable. However, if the discrepancies are above a certain expected or permissible error margin or related, the measured discrepancy may be sufficient to provide some useful information to the user. For instance, the information derived might be used to indicate that the optically readable security element has been exposed to adverse environmental conditions at some point since T2 (especially if the measurements are taken of the same element on which reference measurements were taken).

The magnitude of the difference between predicted and actual measurements (IPRED−IACT1) as measured at T3 could even be used to determine the time TA, which would allow for a temporal indication of the exposure in the adverse environmental conditions, or a time since that exposure.

This all might seem quite abstract, but it is clear that such principles have practical implementations. For instance, the adverse environmental conditions could be an increase in temperature or exposure to sunlight or similar, which could be of particular use for perishable goods, or anything sensitive to such conditions.

Referring back to FIG. 13, IACT2 represents an intensity reading from an optically readable security element that has been held in more benign conditions than expected, for instance at very low temperatures, or perhaps in a darker environment. The very same methodology described above could be used to indicate exposure of the element in more 90 or less 92 adverse conditions, or more or less adverse environments, for example very cold or very hot, very dry or very wet, very bright or very dark. These can all be determined by comparisons from reference or expected temporal excitation-emission relationships 54, and actual measured relationships, for example those indicating exposure to more extreme environments 90, or less extreme environments 92. Humidity and UV exposure are typical aging accelerants that could be measured, as well as acidity/alkalinity.

It will be understood that the readings and comparisons discussed herein may not be used, or even always usable, to determine an accurate numerical indication of, say, an environmental change. However, it may well be that a deviation, or a match, within or outside of an error margin, is sufficient for an issue to be flagged, either for further investigation or as a warning. For example, if a user is reading an element, a reading might reveal a message which simply indicates that the reading is not revealing an expected result. This might allow the user to make a more informed choice about, for example, using or purchasing the element, or an item with which the item is associated.

FIG. 14 shows two different, similar optically readable security elements side-by-side. A first optically readable security element 20 is the same as that already shown in and as described with reference to FIGS. 3 and 5 above, where three different types of optically readable structure 22, 24, 26 are shown as being randomly distributed in or on the element 20. While this arrangement might be advantageous, in terms of providing a unique identifier by way of the random distribution of structures or emitters, this might nevertheless make it quite difficult to easily read and establish relationships for certain types of emitter 22, 24, 26. To solve this problem, then, a related optically readable secure element 100 is shown, in which the different optically readable structures 22, 24, 26 are grouped in particular regions, or bands, and so on. Whilst this might arguably detract from the strength or uniqueness of an identifier that the distribution of structures 22, 24, 26 might provide, the arrangement nevertheless is likely to make it far easier to be able to establish relationships for, and subsequently read, emissions from the particular types of structure 22, 24, 26. A hybrid approach might be possible, where there is a region where the structures are randomly distributed, and a region where the structures are aligned or grouped.

FIGS. 15 to 19 schematically depict general principles associated with the invention, in terms of methodology and apparatus.

FIG. 15 schematically depicts general methodology associated with the present invention. A method of providing information from an optically readable security element is shown. The method comprises optically reading the optically readable security element, the optically readable security element comprising at least one optically readable structure, optically readable in response to excitation of the optically readable structure 110. The reading comprises determining data indicative of an optical property of the optically readable security element using the first emission electromagnetic radiation, emitted in response to excitation of the optically readable structure 112. Typically, the reading will be an intensity measurement, but could in other examples be anything that changes over time, for example a wavelength of emission, a frequency, or a polarisation. The deriving information comprises using the determined data indictive of an optical property, in combination with a temporal excitation-emission relationship related to the optically readable structure, to the variety information 114. The derived information is, of course, in addition, and separate to, the temporal excitation-emission relationship itself. The relationship is related, in that it could a difference between relationships, or a relationship that was established for a very similar element.

FIG. 16 schematically depicts a related system 120 for deriving information from an optically readable security element 122. The system 120 is shown as being localised in some form. This is purely for explanatory purposes. It is clearly conceivable that the system could be distributed over a wide geographical range, for example with a server being located remote from any reader, and any optically readable security element, and so on. The system 120 comprises a reader 124, for optically reading the optically readable security element 122. The optically readable security element 122 comprises at least one optically readable structure, optically readable in response to excitation of the optically readable structure (e.g. by the reader 124 itself). The reading comprises determining data indicative of an optical property of the optically readable security element, using first emission electromagnetic radiation, emitting in response to excitation of the optically readable structure. The system 120 is arranged to use the determined data indicative of an optical property, in combination with a temporal excitation-emission relationship related to the optically readable structure, to derive the information.

In order to undertake such use, the system 120 may comprise or be in communicable connection with a data store or similar, which can store data at least indicative of the relationship with which comparisons may be made in readings of the element 122. The data store 126 may be local to, or even part of the reader 124, but to improve security it is likely that the data store 126 and the reader 124 are separate from one another. For instance, the data store might be located in a remote server or similar (e.g. in or forming a conventional database in the cloud, or in a distributed ledger).

FIGS. 17 and 18 are similar to FIGS. 15 and 16 but relate to the establishment of the temporal excitation-emission relationships for subsequent use in deriving the (additional) information from the optically readable secure element, as described above.

FIG. 17 shows a method of determining a temporal excitation-emission relationship for an optically readable security element. The method comprises optically reading the optically readable security element, the optically readable security element comprising at least one optically readable structure, optically readable in response to excitation of the optically readable structure 130. The reading comprises determining data indicative of an optical property of the optically readable security element using first emission electromagnetic radiation, emitted in response to excitation of the optically readable structure at a first time, and determining data indicative of an optical property of the optically readable security element using second emission electromagnetic radiation, emitted in response to hesitation of the optically readable structure at a second, later time 132. The method further comprises determining the temporal excitation-emission relationship from a variation in determined data indicative of an optical property with respect that excitation of the optically readable structure from the first time to the second time (e.g. by numerical fit, or similar) 134. The determination is such that, at a third, later time 136, information from an at least related optically readable security element (e.g. the same element, or an element from the same batch or in some way structurally similar or identical to that element, for example an element made in much the same way) can be derived from said related optically readable security element using third emission electromagnetic radiation, emitted in response to excitation of the related optically readable structure, the deriving information comprising using the determined data indicative of an optical property, in combination with the temporal excitation-emission relationship related to the optically readable structure, to derive the information.

FIG. 18 schematically depicts a system related to the methodology shown in FIG. 17. There is provided a system 140 for determining a temporal excitation-emission relationship for an optically readable element 142. The system 140 comprises an optical reader 144, for optically reading the optically readable security element, the optically readable security element comprising at least one optically readable structure, optically readable in response to excitation of the optically readable structure. The reading comprises determining data indicative of an optical property of the optically readable security element using first emission electromagnetic radiation, emitted in response to the excitation of the optically readable structure at a first time, and determining data indicative of an optical property of the optically readable security element using second emission electromagnetic radiation, emitted in response to excitation of the optically readable structure at a second, later time. The system 140 is arranged to determine the temporal excitation-emission relationship from a variation in determined data indicative of an optical property with respect to the excitation of the optically readable structure from the first time to the second time. The determination is such that at a third, later time, information from an at least related optically readable security element (e.g. the same element, or an element from the same batch or in some way structurally similar or identical to that element, for example an element made in much the same way) can be derived from said related optically readable security element using the third emission electromagnetic radiation, emitted in response to excitation of the related optically readable structure, the deriving information comprising using the determined data indicative of an optical property, in combination with the temporal excitation-emission relationship related to the optically readable structure, to derive the information.

For much of the same reasoning as described in relation to FIG. 16, the system 140 of FIG. 18 can be provided with (which includes being able to communicate remotely with) a data store 146 which can be used to store the determined temporal excitation-emission relationship.

The method and/or system may also be arranged to assign a unique identifier to the established relationship, so that the relationship may be associated with a particular element or related element, for use in future readings of that element or related element and associated reference to the relationship.

Finally, FIG. 19 shows an exemplary optically readable security element which comprises at least one optically readable structure 152, optically readable in response to excitation of the optically readable structure 152. Typically, the optically readable structure has a related, and known, temporal excitation-emission relationship, such that the relationship can be used in combination with the systems and methodology described above. The optically readable security element 150 is readable to determine data indicative of an optical property of the optically readable security element using first emission electromagnetic radiation, emitted in response to excitation of the optically readable structure 152. In use, the deriving information comprises using the determined data indicative of an optical property, in combination with the known, temporal excitation-emission relationship related to the optically readable structure 152, to derive the information. As discussed above, the element 150 could be, or could be located as part of, a QR Code, a barcode, a hologram etc.

The optically readable structure 152, may, as described above, be continuous, or comprise one or more discrete components. The optically readable structure 152 may be used in isolation or be embedded within a matrix or similar. The optically readable structure 152 may be self-supporting in nature, or may be provided with or on some form of backing element or substrate 154.

The security element 150 may be provided with a capping layer 156 for the optically readable structure 152. The capping layer 156 will be optically transparent to any excitation and/or emission electromagnetic radiation, or at least have a known filtering functionality that can be taken into account when determining any reference measurements and/or subsequent readings of the optically readable structure 152. The capping layer may be particularly chosen to ensure, or at least attempt to maintain, a temporal excitation-emission relationship of one or more optically readable structures. For example, the layer 156 may be tailored to or for a particular structure, for example to use that structure, or its temporal excitation-emission relationship as a more stable, or more reliable, baseline, against which predictions or measurements may be made.

As discussed above, the present inventions finds wide application. The invention might be applied to existing optical security elements, or new elements could be fabricated in the context of the present concepts.

If the element is serving as or providing, at least partly, an identifier, a series of measurements taken at different times may have been made in the factory where the element was made. This could produce a map where the temporal relationship of the emission from different locations on the tag is known. When the reader makes a measurement, it could perform an online (via a check to a server) or an offline (via a stored database) verification.

For environmental checking, or a more simple validation, the element could be printed or otherwise provided with squares/regions of different materials (i.e. having certain structures), each having known average or nominal temporal dependences that are hard-coded into the reader—i.e. where small, high-resolution, variations are not important. Then the reader, with prior knowledge of the construction of the element, could infer the age, or the environmental treatment, by just measuring the ratio of intensities for the different regions. If the element were contained in or around a QR Code, barcode or similar, then the date of manufacture could be encoded into QR Code/barcode etc in the tag also, so that the environmental conditions could be inferred directly.

It may be possible to employ more complex implementations. For example, three different types of emitter could be used, which respond to environmental changes in different ways. One is insensitive to its environment (i.e. very stable) and one highly sensitive (unstable), and each has a different (and known) aging profile. By comparing the ratios of intensities it could be possible to deconvolute the age and environmental conditions.

As discussed above, the extraction of information from an optical emitter as described herein might intentionally or inadvertently verify that it is complex at the atomic scale, and (e.g.) zero-dimensional. For example, if a reading matches a prediction, then by definition the verification is made, since the prediction is based on a numerical fit of readings undertaken for that complex system. This prevents a simulation attack, where by a passive representation of the security element (e.g. a photocopy) could be passed off as being genuine. Such passive representation will fail authentication as the complex dynamics and relationships that are measured can only be reproduced by a complex, for example, quantum system. This is also true of relationship between emitters interacting with one another on the element. In isolation, a behaviour may be known and easier to replicate or spoof, but in combination with the presence of other emitters, the behaviour is more complex and likely impossible to easily (if at all) predict, without an actual reading of that actual structure.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of deriving information from an optically readable security element, comprising:
   optically reading the optically readable security element, the optically readable security element comprising at least one optically readable structure, optically readable in response to excitation of the optically readable structure;
   the reading comprising:
   determining data indicative of an optical property of the optically readable security element using first emission electromagnetic radiation, emitted in response to excitation of the optically readable structure; and
   using the determined data indicative of an optical property, in combination with a temporal excitation-emission relationship related to the optically readable structure, to derive the information, wherein the temporal excitation-emission relationship is defined as a degradation of excitation-emission performance over time of the optically readable security element.

2. The method of claim 1, wherein the optically readable security element comprises:
   a first optically readable structure, optically readable in response to excitation of the first optically readable structure, and having a first temporal excitation-emission relationship;
   a second optically readable structure, optically readable in response to excitation of the second optically readable structure, and having a second temporal excitation-emission relationship.

3. The method of claim 2, wherein the deriving information comprises:
   comparing the determined data of the optically readable structure with the temporal excitation-emission relationship; or
   comparing the determined data of the first optically readable structure with the first temporal excitation-emission relationship; and
   comparing the determined data of the second optically readable structure with the second temporal excitation-emission relationship.

4. The method of claim 3, wherein the deriving information comprises:
   comparing a difference between the determined data for the first optically readable structure and the second optically readable structure, with a difference between the first temporal excitation-emission relationship and the second temporal excitation-emission relationship.

5. The method of claim 1, wherein the derived information relates to an age of the optically readable security element.

6. The method of claim 1, wherein the derived information relates to a deviation from an expected temporal excitation-emission relationship.

7. The method of claim 1, wherein the derived information relates to a correction factor to be applied to a reading of the optically readable security element.

8. The method of claim 1, wherein the derived information relates to verifying that the at least one optical structure is a quantum system and complex at the atomic scale.

9. The method of claim 1, wherein the at least one optical structure comprises one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions.

10. The method of claim 1, wherein the reading is undertaken for multiple locations across the security element.

11. The method of claim 1, additionally comprising using the reading to determine a unique identifier for the optically readable security element.

12. A system for deriving information from an optically readable security element, comprising:
    an optical reader, for optically reading the optically readable security element, the optically readable security element comprising at least one optically readable structure, optically readable in response to excitation of the optically readable structure;
    the reading comprising determining data indicative of an optical property of the optically readable security element using first emission electromagnetic radiation, emitted in response to excitation of the optically readable structure; and the system being arranged to use the determined data indicative of an optical property, in combination with a temporal excitation-emission relationship related to the optically readable structure, to derive the information, wherein the temporal excitation-emission relationship is defined as a degradation of excitation-emission performance over time of the optically readable security element.

13. A method of determining a temporal excitation-emission relationship for an optically readable security element, the method comprising:

optically reading the optically readable security element, the optically readable security element comprising at least one optically readable structure, optically readable in response to excitation of the optically readable structure;

the reading comprising determining data indicative of an optical property of the optically readable security element using first emission electromagnetic radiation, emitted in response to excitation of the optically readable structure at a first time, and determining data indicative of an optical property of the optically readable security element using second emission electromagnetic radiation, emitted in response to excitation of the optically readable structure at a second, later time; and the temporal excitation-emission relationship being determined from a variation in determined data indicative of an optical property with respect to the excitation of the optically readable structure from the first time to the second time, such that, at a third, later time, information from an at least related optically readable security element can be derived from said related optically readable security element by determining data indicative of an optical property of the related optically readable security element using third emission electromagnetic radiation, emitted in response to excitation of the related optically readable structure, the deriving information comprising using the determined data indicative of an optical property, in combination with the temporal excitation-emission relationship related to the optically readable structure, to derive the information, wherein the temporal excitation-emission relationship is defined as a degradation of excitation-emission performance over time of the optically readable security element.

14. A system for determining a temporal excitation-emission relationship for an optically readable security element, comprising:

an optical reader, for optically reading the optically readable security element, the optically readable security element comprising at least one optically readable structure, optically readable in response to excitation of the optically readable structure;

the reading comprising determining data indicative of an optical property of the optically readable security element using first emission electromagnetic radiation, emitted in response to excitation of the optically readable structure at a first time, and determining data indicative of an optical property of the optically readable security element using second emission electromagnetic radiation, emitted in response to excitation of the optically readable structure at a second, later time; and the system being arranged to determine the temporal excitation-emission relationship from a variation in determined data indicative of an optical property with respect to the excitation of the optically readable structure from the first time to the second time, such that, at a third, later time, information from an at least related optically readable security element can be derived from said related optically readable security element by determining data indicative of an optical property of the related optically readable security element using third emission electromagnetic radiation, emitted in response to excitation of the related optically readable structure, the deriving information comprising using the determined data indicative of an optical property, in combination with the temporal excitation-emission relationship related to the optically readable structure, to derive the information, wherein the temporal excitation-emission relationship is defined as a degradation of excitation-emission performance over time of the optically readable security element.

15. An optically readable security element from which information is derivable, comprising:

at least one optically readable structure, optically readable in response to excitation of the optically readable structure;

the optically readable structure having a related, and known, temporal excitation-emission relationship;

the optically readable security element being readable to determine data indicative of an optical property of the optically readable security element using first emission electromagnetic radiation, emitted in response to excitation of the optically readable structure; and in use, the deriving information comprising using the determined data indicative of an optical property, in combination with the known, temporal excitation-emission relationship related to the optically readable structure, to derive the information, wherein the temporal excitation-emission relationship is defined as a degradation of excitation-emission performance over time of the optically readable security element.

16. The method of claim 2, wherein the reading comprises determining data indicative of an optical property of the optically readable security element using first emission electromagnetic radiation, emitted in response to excitation of the first optically readable structure, and determining data indicative of an optical property of the optically readable security element using second emission electromagnetic radiation, emitted in response to excitation of the second optically readable structure.

17. The method of claim 16, wherein the deriving information further includes using the determined data indicative of an optical property determined from each of the first and second optically readable structures, in combination with the first and second temporal excitation-emission relationships related to the first and second optically readable structures, to derive the information.

18. The method of claim 6, wherein the deviation is indicative of one or more of:

exposure of the optically readable security element to environmental factors different to those for which the expected temporal excitation-emission relationship was established;

tampering with the optically readable security element; or a non-authentic optically readable security element.

19. The method of claim 7, wherein the derived information further relates to an age of the optically readable security element based on the derived information, or a deviation from an expected temporal excitation-emission relationship based on the derived information.

20. The method of claim 11, further comprising:
using one or more excitation-emission relationships, for one or more optically readable structures, in one or more locations of the security element; or
using the derived information, for one or more optically readable structures, in one or more locations of the security element.

\* \* \* \* \*